United States Patent [19]

Wardle et al.

[11] Patent Number: 5,081,903

[45] Date of Patent: Jan. 21, 1992

[54] MULTIPLEXED HYDRAULIC CONTROL SYSTEM WITH MULTI-BIT BINARY SELECTOR SIGNAL CONTROL

[75] Inventors: John W. Wardle, Roscoe; Dale W. Sievert, Freeport; James L. Leeson, deceased, late of Rockford, all of Ill., by Elizabeth J. Leeson, on behalf of the Deceased

[73] Assignee: Woodward Governor Company, Rockford, Ill.

[21] Appl. No.: 462,739

[22] Filed: Jan. 9, 1990

[51] Int. Cl.$^5$ .............................................. F15B 9/09
[52] U.S. Cl. ......................................... 91/361; 91/521; 91/529; 137/596.15; 137/596.16; 137/627
[58] Field of Search .............................. 91/529, 521–524, 91/361, 461, 363 R; 137/596.15, 627, 596.16

[56] References Cited

U.S. PATENT DOCUMENTS

| | | | |
|---|---|---|---|
| 3,556,144 | 1/1971 | Bickers et al. | 137/596.15 |
| 3,645,141 | 2/1972 | Moore et al. | 73/420 |
| 4,191,215 | 3/1980 | Gonner | 137/870 |
| 4,271,867 | 6/1981 | Milberger et al. | 137/625 |
| 4,325,127 | 4/1982 | Major | 364/510 |
| 4,664,136 | 5/1987 | Everett | 137/85 |
| 4,671,166 | 6/1987 | Glaze et al. | 91/521 X |
| 4,712,173 | 12/1987 | Fujiwara et al. | 364/138 |
| 4,744,218 | 5/1988 | Edwards et al. | 91/361 X |
| 4,986,305 | 1/1991 | Richards et al. | 137/625.15 |

FOREIGN PATENT DOCUMENTS 2174824 11/1986 United Kingdom .

OTHER PUBLICATIONS

"Imagine . . . A Self–Calibrating Pressure Transducer" advertisement for Scanivalve Corp., San Diego, Calif., 1987.
"Metering Valve W/Regulator" article, Tech Data South Bend Controls Inc. Bulletin, PV-210, SBC, 1987.
"Metering Valve" article, Tech Data South Bend Controls Inc. Bulletin, PV-211, SBC, 1987.
Article entitled "Actuator Accepts Electrical Digital Control Signals Directly–Eliminates Digital–To–Analog Converters".

Primary Examiner—Edward K. Look
Assistant Examiner—George Kapsalas
Attorney, Agent, or Firm—Leydig, Voit & Mayer

[57] ABSTRACT

A multiplexed hydraulic control system having a plurality of hydraulic channels for individually controlling the positions of a plurality of actuators in the respective channels in accordance with a corresponding plurality of electrical control signals. The system includes a relatively small multiplexing valve or valve array which has a common input and a plurality of individually selected outputs. The multiplexing valve has a control input which is responsive to a source of binary selector signals, such selector signals being used to directly address any particular channel connected to the multiplexer. The system also includes means for modulating a hydraulic signal in accordance with selected ones of the plurality of electrical control signals, and applying the modulated hydraulic signal to the multiplexer common input. Control means then coordinates the addressing of the multiplexer with the modulating of the hydraulic signal to assure that hydraulic signals of the appropriate magnitude are coupled to each addressed channel, thereby to control all of the channels in accordance with the control signals for each channel.

17 Claims, 7 Drawing Sheets

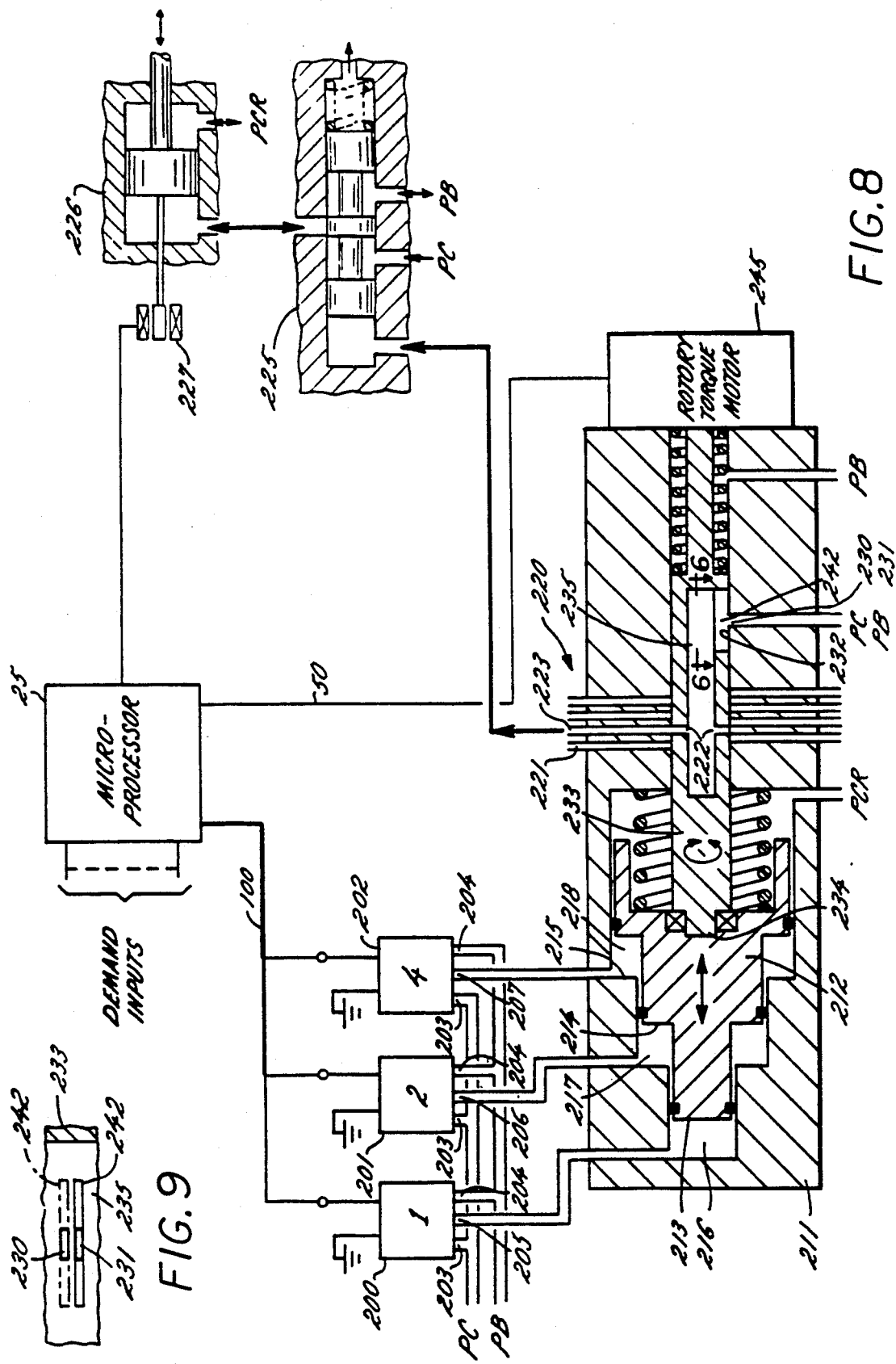

MULTIPLEXED HYDRAULIC CONTROL SYSTEM WITH MULTI-BIT BINARY SELECTOR SIGNAL CONTROL

BACKGROUND OF THE INVENTION

1. Field of the Invention

This invention relates to hydraulic control systems, and more particularly to such systems in which a plurality of hydraulic actuators are to be precisely positioned in dependence on the magnitude of a similar plurality of electrical control signals.

2. Description of the Prior Art

There are numerous such control systems, and this invention would represent a significant advantage in connection with many of them. One exemplary and very significant application of such controls is in aircraft systems where hydraulic controls are provided for adjusting mechanical variables in jet aircraft engines. The gas turbine engines which are used to power conventional jet aircraft have commonly used hydraulic actuators for control of air valves, fuel valves, engine variable geometry, and the like. As engine designers attempt to achieve more and more performance from the gas turbine, the number of hydraulic actuators has increased significantly, and may approach 17 in number. Even gas turbine engines used on older commercial aircraft typically have on the order of six hydraulic actuators.

Heretofore, each hydraulic actuator was provided with a device to convert an electrical input signal into a mechanical actuator position. Most typically, that had been done with a torque motor connected to and driving a hydraulic servo valve; the servo valve, in turn, controlled the supply of hydraulic fluid to the actuator. The torque motor, being dedicated to the associated actuator, could be driven for as long as additional actuator movement was desired. However, both torque motors and servo valves are fairly expensive, and both are fairly weighty components, particularly for aircraft applications where weight savings on the order of pounds can translate into substantial operating cost savings over the life of the aircraft.

Applicants are aware of a concept having been proposed to reduce weight and cost in such systems, by using a single pilot valve multiplexed among a plurality of actuators. In substance, the pilot valve has a spool which is rotated for multiplexing and which is positioned vertically by the torque motor to establish control positions. The spool and valve would be modified to provide a plurality of outlet ports at different angular positions of the spool such that the vertical control position of the valve combined with a plurality of angular multiplex positions could be used to sequentially deliver hydraulic fluid to a plurality of actuators. A position sensor on the rotary multiplexer would be used to coordinate multiplexed electrical signals for the pilot valve with the time slots of the multiplexer.

It is applicant's belief that a system of that type could not be reduced to practice for any but the most rudimentary systems because of a number of limitations, the most prominent one being the substantially reduced flow rate to any given actuator for a servo valve of any reasonable size. The flow rate reduction is a result of two factors—1) reduced flow through a pilot valve which is configured as a multiplexer, and 2) the fact of multiplexing itself which has flow going to an actuator only during its time slot. For a three channel system, the flow rate per cycle as compared to a standard non-multiplexed pilot valve would be reduced by about a factor of about 18. Thus, while in principle the system might work in applications where speed of response and fineness of control are not important criteria, in a jet engine control, for example, the concept would not appear to be workable.

Multiplexing of hydraulic circuits is not broadly new. It can be used for example in sharing a single transducer among a number of hydraulic or pneumatic channels, such as illustrated in Moore et al. U.S. Pat. No. 3,645,141. The opportunity to share a control servo valve among multiple actuators is also suggested in the literature, but on a manually controlled rather than a simultaneous multiplexed real time basis, insofar as applicant is aware. In contrast, in a true hydraulic multiplexed system, control is being maintained over all of the channels, while servicing those channels individually and separately, but with sufficient frequency to maintain the outputs as representative of the inputs in substantially real time.

With respect to the prior multiplexing concept, insofar as applicant is aware, it has relied on a rotary multiplexer for sequentially activating the ports in the system. While rotary multiplexing can, in principle, be built in a very reliable fashion, acceptance of the rotary mode of operation imposes a number of drawbacks. Most particularly is the fact that the sequence is fixed by virtue of the mechanical connection of the channels to the rotary multiplexer. Each channel must be serviced in its sequence whether or not the channel has a demand for motion of its associated actuator. Thus, in the event that one of the channels demands a large actuator movement whereas another channel in the system is completely quiescent, each of the channels must be serviced in their assigned sequence and for the duration of their assigned time slot, even if service for the former is inadequate and service for the latter is superfluous. In summary, it is not only impossible to alter the sequence of channels to be serviced during operation of a rotary system, but it is also not possible to alter the length of the time slot of one channel with respect to any of its neighbors. This inherent inflexibility is undesirable in certain circumstances.

Most high performance aircraft, including large commercial jetliners and military aircraft, utilize digital computers in the systems which control the aircraft. When such a digital computer is adjusting a particular aircraft variable, it will typically "know" the identity of the channel or actuator which it is attempting to adjust, and that knowledge will typically be in the form of a binary digital address for the channel in question. However, particularly in rotary systems, it was not possible to use that digital information to address the channel, since selection is accomplished by rotation of the multiplexer rather than addressing of a particular device.

SUMMARY OF THE INVENTION

In view of the foregoing, it is a general aim of the present invention to provide a practical and reliable hydraulic multiplexed control system which does not rely upon rotary commutation for multiplexing.

In that regard, it is an object of the present invention to provide a reliable highly accurate multiplexed hydraulic control system in which the control has the flexibility for activating the outlet channels in any desired sequence.

Further in that regard, it is an object to provide such a control system in which the program control has the opportunity to independently adjust dwell times for each channel according to the demands of the system.

Yet another object of the invention is to provide a reliable highly accurate multiplexed hydraulic control system which not only can randomly address the channels which it services, but which utilizes digital signals which can be derived from a controlling computer to address the respective channels.

It is a feature of the present invention that size and weight reduction are achieved in a multiple channel hydraulic control system by provision of a relatively small multiplexing valve or valve array which has a common input and a plurality of individually selected outputs. The multiplexing valve has a control input which is responsive to a source of binary selector signals, such selector signals being used to directly address any particular channel connected to the multiplexer. The system also includes means for modulating a hydraulic signal in accordance with selected ones of a plurality of electrical control signals, and applying the modulated hydraulic signal to the multiplexer common input. Control means then coordinates the addressing of the multiplexer with the modulating of the hydraulic signal to assure that hydraulic signals of the appropriate magnitude are coupled to each addressed channel, thereby to control all of the channels in accordance with the control signals for each channel.

It is an advantage of such a system that the computerized control which is charged with maintaining the position of the actuators in the channels of the hydraulic control system has the opportunity to activate the channels in any desired sequence, for any desired length of time, and by way of digitally coded addresses.

It is a feature of the present invention that multi-bit binary selector signals are provided for controlling the multiplexer, and each selector signal has a binary value which corresponds to its associated channel of the multiplexer. Thus, the multiplexer can, if desired, be run randomly, and in order to randomly activate a selected channel, it is simply necessary to address that channel to cause the multiplexer to direct controlled fluid flow to the output port which services the addressed channel.

With the random access capability thus provided by a multiplexer in accordance with the present invention, the computerized control which is typically associated with such devices has exceptional flexibility in controlling its channels. The control can be configured, for example, to access particular channels only when those channels demand service, to prioritize certain channels related to equipment whose movement is more critical than that of others, or to alter a normal pattern of port access in abnormal situations.

Among the advantages achieved by the invention is the simplification in both the multiplexer driver and the multiplexer itself. The multiplexer driver need require no complex drive circuitry, it being necessary to simply select the appropriate binary addresses and couple them to the multiplexer at the appropriate time and at the appropriate level. The multiplexer itself is also simplified, using simple and inexpensive elements, such as ordinary solenoid operated valves, which can be produced to operate with the high reliability demanded of jet aircraft controls.

Other objects and advantages will become apparent from the following detailed description when taken in conjunction with the drawings, in which:

BRIEF DESCRIPTION OF THE DRAWINGS

FIG. 8 is a diagrammatic illustration of a further embodiment of the present invention also responsive to binary hydraulic logic signals;

FIG. 9 is a diagrammatic illustration showing further details of the inlet porting arrangement of the rotary portion of the valve of FIG. 8.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
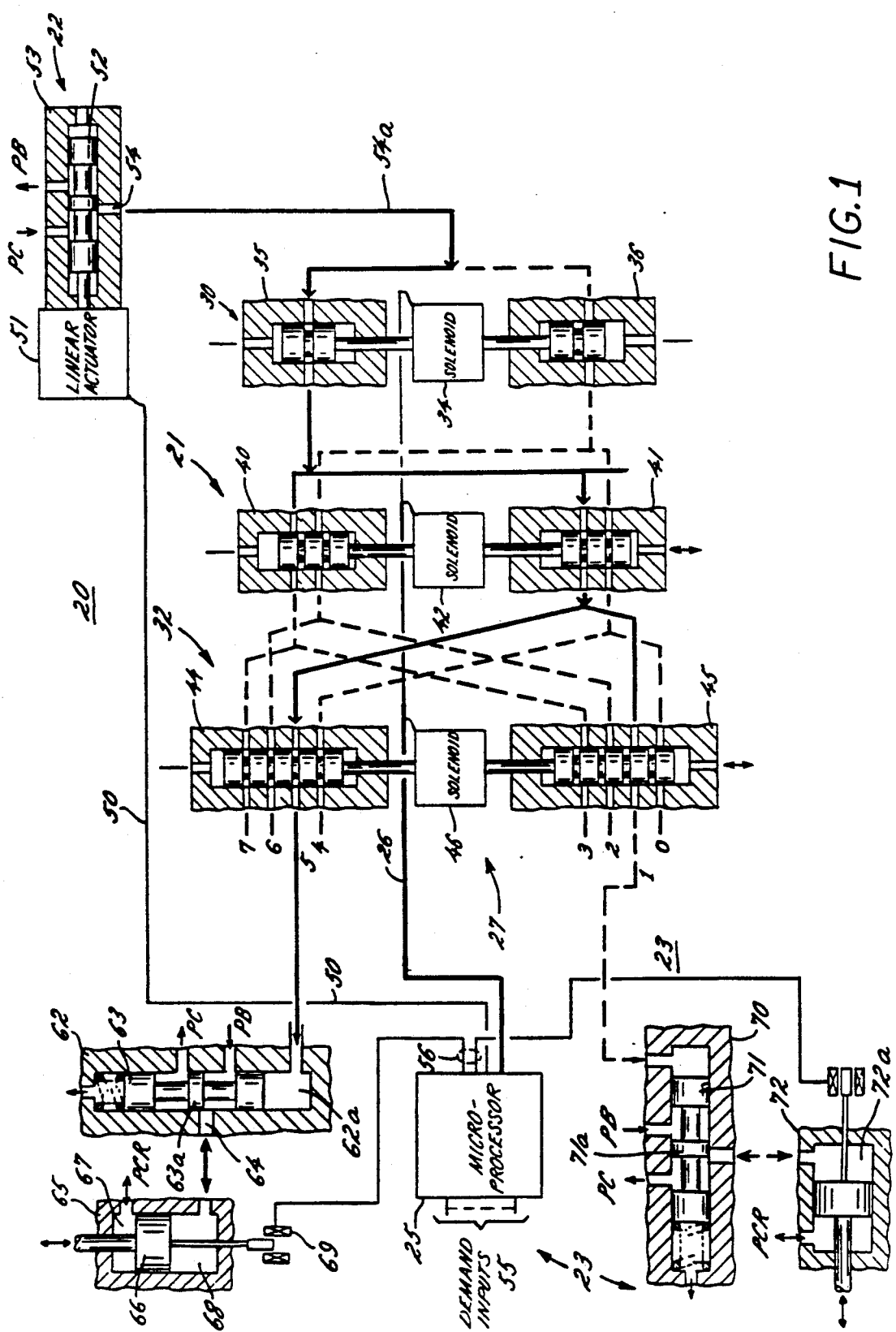
FIG. 1 is a diagrammatic illustration of a first embodiment of a binary addressable multiplexed hydraulic control system exemplifying the present invention.

Turning now to the drawings, FIG. 1 shows a first embodiment of a multiplexed hydraulic control system exemplifying the present invention. More particularly, FIG. 1 illustrates a multiplexed hydraulic control system 20 including multiplexing means 21, a common source of hydraulic fluid 22 which is modulated in accordance with a plurality of electrical control signals relating to the respective channels, the channels being illustrated only in part and designated generally by reference numeral 23.

In the embodiment illustrated in FIG. 1, the multiplexer means 21 is responsive to a source of multi-bit binary selector signals for individually addressing the respective channels, such source being illustrated as microprocessor 25. In practicing the present embodiment of the invention, the microprocessor outputs a multi-bit binary address on an output bus 26 which is coupled to electrical actuators generally indicated at 27 for driving valve means in the multiplexer 21 to individually and selectively activate the channel whose address appears on the bus 26.

In the FIG. 1 embodiment, the multiplexer means 21 is shown as a logic tree having three levels 30, 31, 32, each level including a spool valve and an electrical operator for positioning the spool. For example, in the lowermost level 30 (which responds to the least significant bit of the address word) there is provided a solenoid 34 which actuates a pair of valves 35, 36. The level 30 is illustrated with the solenoid 34 in the energized condition, in which condition the valve section 35 is open to pass fluid from the hydraulic control source 22, and the valve 36 is closed blocking fluid flow to its output.

The outputs of first stage valve members 35, 36 are coupled to selected inputs of second stage valve members 40, 41 whose position is controlled by an actuating solenoid 42. In logic tree fashion, the outputs of valves 40, 41 are coupled as inputs to selected inputs of upper stage valves 44, 45 whose position is controlled by an actuating solenoid 46 in response to the level of the most significant bit of the address word.

In the condition illustrated in FIG. 1 solenoids 34 and 46 are energized while solenoid 42 is not. Thus, it is seen that the upper sections 35, 44 of the valves associated with solenoids 34 and 46 are open whereas the lower section 41 associated with de-energized solenoid 42 is open.

It will be appreciated by following the solid line flow path from the inlet PC through the open valves, that fluid flow from input to output is over a single path through the first stage valve 35, then through the uppermost section of valve 41 and finally through the third section of valve 44, thereby being passed through logic tree fashion to the channel 5 output of the uppermost valve section 32. The dashed line hydraulic connections illustrate that all other channels include a closed valve stage. It is seen that channels 0 through 3 are all deactivated by virtue of the nonoperated condition of valve section 45, channels 6 and 7 are deactivated by virtue of the nonoperated status of valve section 40, and channel 4 is deactivated by virtue of the nonactivated status of valve section 36. Thus, the binary signals applied to solenoids 34, 42 and 46 (101 in the example considered) are decoded by the logic tree in which the valves are connected to individually activate the addressed channel. As a further example, if a binary 7 were coupled on the address bus 26 to the solenoids in the multiplexer, a path would be traced through the upper section of each upper valve 35, 40 and 44 to the channel 7 output of the upper stage 32.

It will further be apparent that additional levels can be added to the valve tree in order to operate additional channels. For example, if one more level were added, the system could be capable of controlling 16 channels and would require use of a 4-bit address word.

As noted at the outset, it is the function of the multiplexed hydraulic control system to pass modulated hydraulic flow to the respective channels for controlling the positions of actuators in those channels in accordance with a plurality of electrical control signals. In the illustrated embodiment, the electrical control signals are also produced by the microprocessor 25, and are coupled serially onto a bus 50 to a linear actuator 51 which controls the position of a spool 52 in a spool valve 53. Thus, the microprocessor 25 generates signals which are a function of the demanded position (see inputs 55) and the actual position of each actuator (see inputs 56), and when it is desired to reposition an actuator couples an electrical signal onto the bus 50 for positioning the spool 51 in the valve 53 which acts as a pilot to control flow from either source PC or to sump PB via an output port 54 of the valve 53. The magnitude of the signal on the bus 50 controls the position of the valve and thus the rate and direction of hydraulic flow through the output port 54. At the same time the microprocessor 25 is coupling the electrical control signals on the bus 50 to adjust the magnitude of the modulated hydraulic signal in the output port 54, it is simultaneously coupling address signals on the address bus 26 for setting up the multiplexer 21 to select the channel associated with the control signal on the bus 50. Thus, the concurrence of the control signal on the bus 50 which modulates the hydraulic flow and the address signal on bus 26 which selects the channel to receive that flow allows the microprocessor 25 to control any of the channels serviced by the system. Those channels can be controlled in a repeating sequence in time division multiplexed fashion, or as noted above, the microprocessor can sense conditions in the channels as well as other conditions on demand inputs 55 to determine a non-repetitive sequence for adjusting the actuators in the channels.

There are at least two options for coupling the modulated hydraulic flow produced by the pilot valve 53 to a common input of the addressed channels. First of all, the output 54 of the pilot valve 53 can be connected directly to the inlet of the lowest level 30 of the logic tree as illustrated in connection with FIG. 1. Thus, the modulated flow will be physically switched through the logic tree and coupled directly from the addressed output of the logic tree to the associated channel. Alternatively the logic tree can be used to switch an unmodulated hydraulic signal derived from the high pressure source PC, and to utilize the multiplexer outputs to control small hydraulic selector valves, one in each channel.

Recalling that the channel 5 is the activated channel in the illustrated condition of the multiplexer, it is seen that the common source of hydraulic flow from the valve 53 is connected through the multiplexer 21 to a control chamber 62a of a second stage valve 62. Flow into or out of the control chamber 62a controls the position of a spool 63, which, by means of metering land 63a, controls flow from source PC or sump PB through an outlet port 64 which in turn positions the output actuator 65. The spool 63 is positioned such that the metering land 63a has the output port 64 partially opened to sump PB such that in the illustrated condition fluid is being moved at a rate controlled by the position of land 63a from the chamber 68 of the actuator. As described more completely in U.S. application Pat. No. 4,984,505, among the functions of the second stage valve 62 are to provide hydraulic amplification (a rather small flow into the control chamber 62a can control a much larger flow directly from source or sump to the output port 64). A second function of the second stage valve, in addition to providing amplification, is to provide the possibility for continuous flow in the channel to the actuator, not only during the time slot which is assigned to the channel but also when the multiplexer is servicing other channels. Thus, the second stage valve 62 has its spool 63 locked in its last position whenever fluid flow into or out of the control chamber 62a is terminated, leaving the possibility for continued flow through the output port 64 even when the second stage valve 62 is not receiving additional fluid.

The output actuator 65 has a piston 66 which is positioned by flow from the second stage valve into a chamber 68 to drive the piston 66 upwardly as fluid is added to the chamber 68 or to allow the piston to fall downwardly when fluid is removed from the chamber 68. An intermediate source of regulated pressure PCR coupled to the upper chamber 67 serves as a hydraulic spring to force the piston 66 downwardly when fluid is removed from the chamber 68, or to allow the piston 66 to move upwardly when fluid is added. Mechanically coupled to the piston is feedback means 69 which produces an electrical signal coupled back to the microprocessor 25 via one of the feedback inputs 56. Importantly, the signal produced by feedback means 69 relates to both the actual position of the actuator operator and the rate of movement of the actuator operator. The rate information, as described in the aforementioned U.S. Pat. No. 4,984,505, is important in stabilizing the control loop which includes a second stage valve driving an actuator, both of which are integrators. To the extent necessary, the disclosure of this patent application is incorporated herein by reference.

Referring briefly to the illustrated channel which is not currently being serviced in the system condition shown in FIG. 1, it is seen that the second stage valve 70 is coupled to non-activated channel 1 and thus the input of the second stage valve 70 remains cut off from the control source. Thus, no additional modulated flow is passed to the associated second stage valve 70 and the spool 71 of that second stage valve remains in its previously adjusted position allowing flow to the associated actuator 72 as determined by the prior adjustment made by the microprocessor 25. As can be seen, in the previously adjusted position in which the second stage valve 70 remains, the metering land 71a has slightly opened the output port to the source PC, continuing to pump additional fluid into the control chamber 72a of hydraulic actuator 72. Whenever it is desired to change the direction or rate of movement of the actuator 72, the microprocessor 25 simply needs to address channel 1 on the address bus 26 and couple a control signal on the control bus 50 of the appropriate magnitude to either pass additional fluid to the second stage valve 70 thereby decreasing flow rate therethrough or withdraw fluid from the second stage valve 70 to increase flow rate therethrough.

The system of FIG. 1 is illustrated in schematic form, and configuring mechanical equipment to accomplish the functions described in detail above can make use of certain options in reducing the amount of equipment required. The system is not of minimum configuration in order to illustrate certain optional features which can be used when desired. However, in configuring a minimum system, the upper and lower valve sections can be combined into a single unit by having a single inlet port controlled by a valve spool to be switched to either of two closely adjacent outlets depending on whether the solenoid is activated or deactivated. The electrical equivalent of this suggested modification is replacing a pair of single pole single throw switches with one single pole double throw switch.

Figure 2:
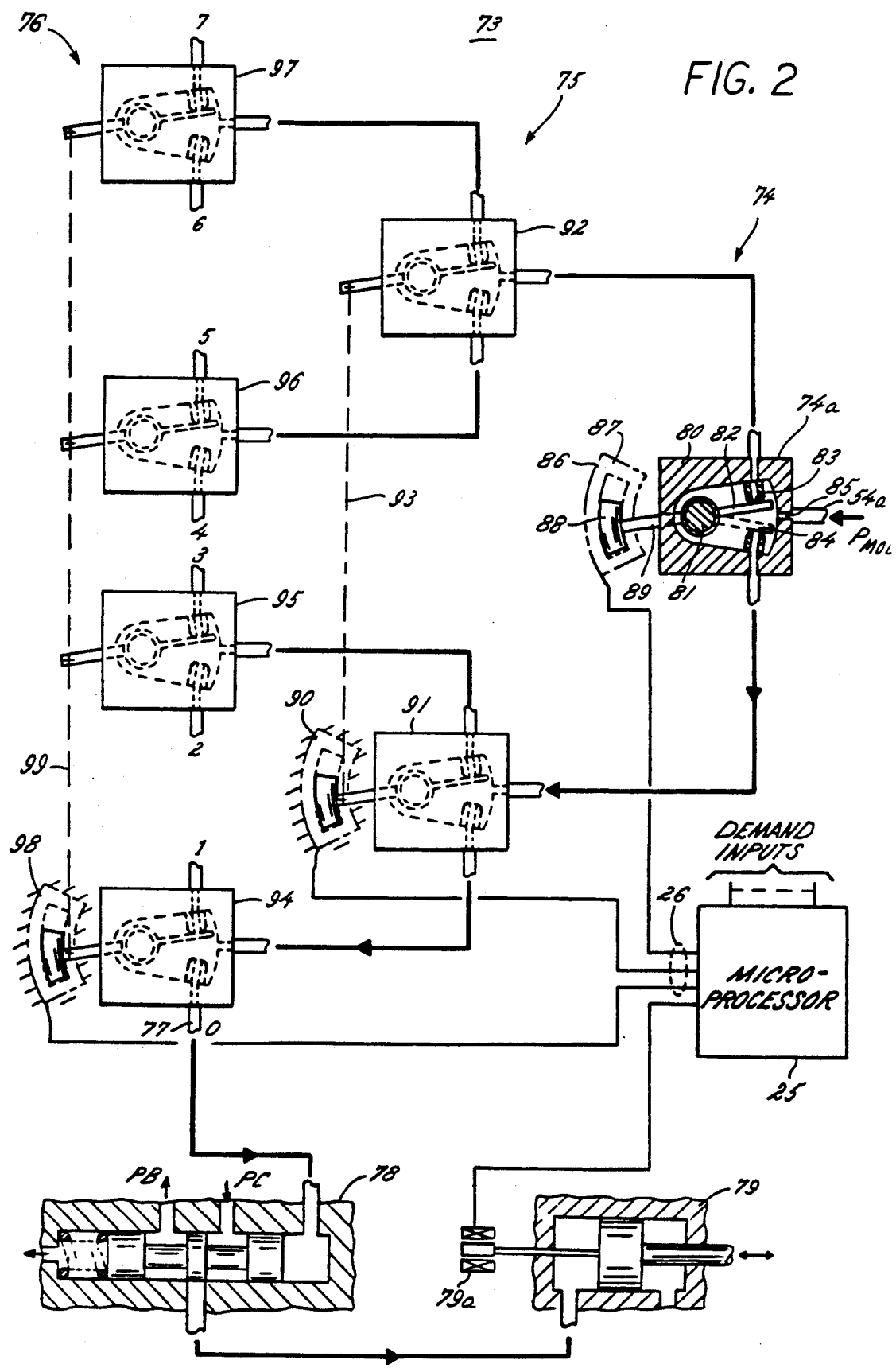
FIG. 2 is a diagrammatic illustration of a further embodiment of the present invention illustrating the use of flapper valves connected in a logic tree.

Turning now to FIG. 2, there is shown a further embodiment of the present invention which employs a multiple stage logic tree of valves of a different type. More particularly, at the right of FIG. 2 there is shown an inlet 54a which is to be connected to a modulated source of hydraulic fluid such as the output 54 of the pilot valve 53 of the FIG. 1 embodiment. As in the FIG. 1 embodiment, the multiplexer section 73 of FIG. 2 is comprised of three levels 74, 75, 76 and therefore in binary fashion is capable of controlling fluid flow in eight channels. Only one of those channels, lowermost channel 0, is illustrated in its entirety as having an output 77 from the lowermost valve in the third level 76 (channel 0), and is shown to include a second stage valve 78 driven directly from the output 77. As in the FIG. 1 embodiment, the second stage valve 78 is connected to the high pressure source PC and sump PB for controllably providing fluid flow to an actuator 79 having both position and rate feedback sensors 79a fed back to the controlling microprocessor 25. Each of the other valves for channels 1 through 7 is shown having an associated output, but in order to avoid overcomplicating the drawing, the second stage valve, hydraulic actuator, and feedback sensor for those channels are omitted.

The embodiment of FIG. 2 illustrates use of a valve of a different type, commonly called a flapper valve and having the advantage over the spool valves of FIG. 1 of minimization of valve member mass, and elimination of chip shear problems. Referring to valve 74a in the lowest level 71, the valve is seen to include a valve body 80 having a pivot point 81 on which a flapper mechanism 82 is mounted. In the illustrated position, the flapper is in its raised condition in which it maintains a first output port 83 in the closed position while opening a second output port 84 for receiving modulated flow from an inlet 85 connected to the modulated source 54a. The valve includes an electrical operator 86 shown in the illustrated embodiment as a rotary voice coil having a stationary electrical coil 87 in which is mounted a central floating diaphragm 88 which can be pivoted from the rest or quiescent condition illustrated in FIG. 2 to its uppermost dotted line position when the coil 86 is energized. Since an arm 89 connects the movable diaphragm 88 to the pivotable flapper 82, when the coil is energized the flapper member 82 is pivoted to its alternate dotted line position in which output port 83 is opened to receive inlet modulated flow and outlet port 84 is closed.

The flapper valves in the higher levels 75, 76 are similar to the valve 74a in the lowest level 74, except that each of those levels has but a single electrical actuator driving multiple flapper valve assemblies. For example, the second level 72 has a single electrical voice coil 90 driving a pair of flapper valves 91, 92; the fact that the drive is common is illustrated by dashed line interconnection 93. The uppermost level includes four valves 94, 95, 96 and 97, all driven by a single electrical actuator 98 ganged by means of dashed line connection 99 to the actuators of each of the flapper valves in that level.

It will thus be apparent that an electrical binary address coupled by the microprocessor 25 onto address bus 26 will select the valves in the three levels 74–76 in binary fashion to create but a single path through the logic tree for modulated fluid flow from the inlet 54a to the addressed outlet, thereby to adjust, by means of modulated fluid flow, the hydraulic actuator in the addressed channel.

FIGS. 3–6 better illustrate the mechanical configuration of such a system, and further demonstrate the compactness which can be achieved in a multiple level logic tree valving arrangement such as schematically illustrated in connection with FIG. 2. In practice, such valves can be and typically are fairly miniaturized, often being only about 2 inches or even less in diameter.

Figure 3:
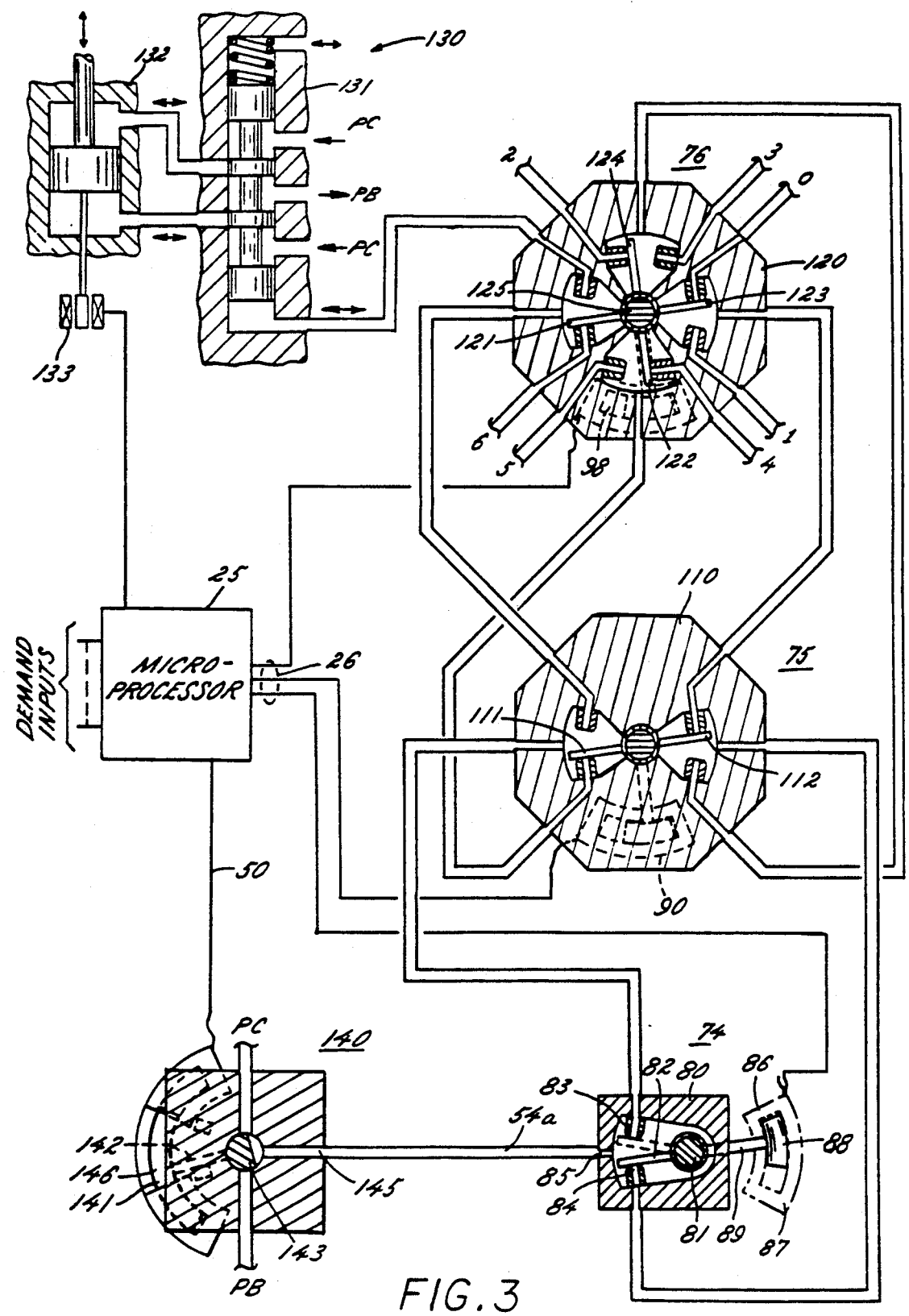
FIG. 3 is a further illustration of the system of FIG. 2 better illustrating the mechanical configuration of the system.

FIG. 3, like FIG. 2, illustrates the multiple level logic tree including lowest level 74, intermediate level 75 and highest level 76 weighted in binary fashion. Accordingly, coupling of address signals by the microprocessor 25 onto address bus 26 will serve to apply a binary address to the multiplexer, which in turn will create a single path through the multiplexer identified by the address, thereby coupling the input to the addressed output. The lowest level 74 includes only a single flapper valve 80 illustrated in the same fashion as the lowest level valve 80 in the FIG. 2 embodiment, except that in the FIG. 3 embodiment the voice coil 86 is energized opening output port 83. The second level 75 of the logic tree is seen to include a pair of flapper valve sections formed in a single valve body 110, the flapper valve operators being indicated at 111, 112. A single voice coil 90, shown energized in the FIG. 3 embodiment, causes the simultaneous pivoting of the flapper members 111, 112 to controllably open or close their output ports.

In similar fashion, the highest level 76 of the logic tree is formed on a single valve body 120 which, in this case, utilizes four flapper operators 121-124, all pivoted in unison about a single pivot point 125. The voice coil 98 for the upper stage is also illustrated in the energized condition, and when de-energized the four flapper members will assume their opposite position to open the ports which are illustrated as closed, and close those illustrated as open.

It is seen that when a three-stage logic tree is used eight channels can be serviced, and one of the channels is generally indicated at 130. The channel 130, as do the other channels, includes a second stage valve 131 controlled by modulated fluid flow directed to the channel from the flapper valve multiplexer. Flow through the second stage valve in turn controls the motion of a hydraulic actuator 132 having feedback means 133 coupled thereto for providing a feedback signal back to the microprocessor 25. It is noted in passing that the channel 130 illustrates an alternate output configuration utilizing double-acting actuators 132 driven by second stage valves 131 having paired outputs for simultaneously supplying both pressure and sump to the respective chambers of the actuator 130 so that full power is applied to the actuator in both the advance and retract directions. Recalling that in the FIG. 3 illustration all of the valves are shown energized, it will be appreciated that the channel 130 illustrated in detail is channel 7, the highest addressed channel in that system. Channel numbers are also provided at the outputs of the multiplexer ports which service those channels.

FIG. 3 shows an alternative means for modulating a hydraulic signal which, in keeping with the rotary nature of the flapper valves, is also a rotary valve generally indicated at 140. The valve 140 has an electrical actuator 141 illustrated in the form of a rotary voice coil, but the rotary voice coil 141, in the preferred embodiment, is not simply a two-position device, but has its position infinitely variable based upon the level of the signal coupled to it. The rotary voice coil is linked by arm 142 to a rotary valve member 143 which selectively couples either the high pressure hydraulic source PC or hydraulic sump PB to an outlet port 145 which serves to provide the modulated hydraulic input signal to the common source 54a of the logic tree. Thus, as signals from the microprocessor adjust the position of a floating diaphragm 146 in the voice coil 141, the valve member 143 is rotated to open or close the outlet port 145 to greater or lesser degree to produce controlled flow from the source PC or to the sump PB.

Figure 4:
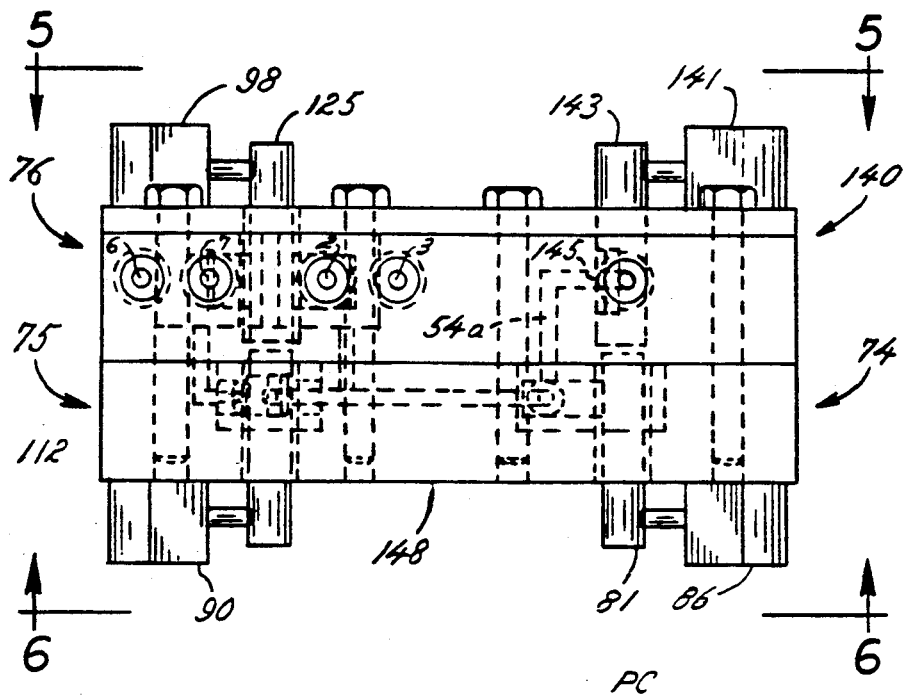
FIG. 4 is an elevation illustrating the assembly of the valve elements of the system of FIG. 3.
Figure 5:
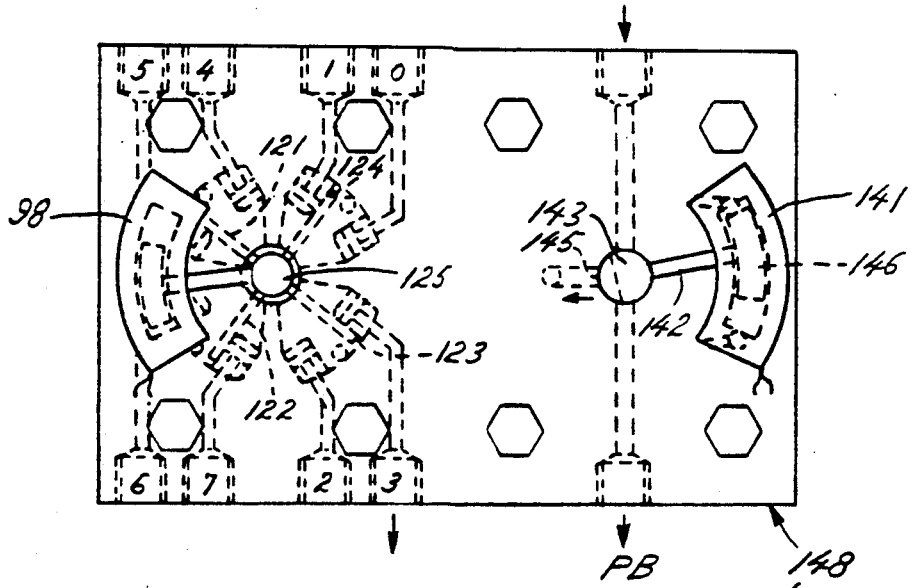
FIGS. 5 and 6 are views taken along the lines 5—5 and 6—6, respectively, of FIG. 4 further illustrating the assembly of the valve elements of the system of FIG. 3.
Figure 6:
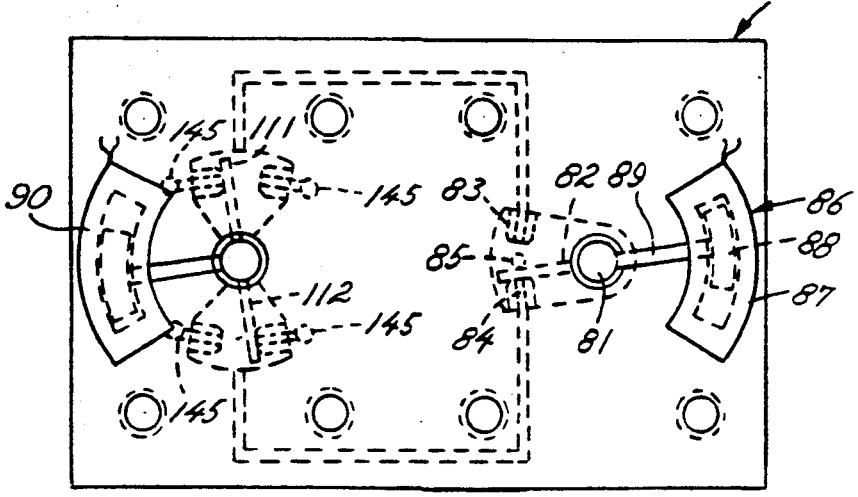

FIGS. 4-6 better illustrate the fact that a rotary flapper valve assembly with rotary hydraulic modulator can be built very compactly, with the individual sections stacked one on the other in a single assembly. More particularly, FIG. 4 shows an elevational view of the system of FIG. 3 in which a single valve body 148 is used for mounting not only the rotary multiplexing valve 140, but also each of the valve sections 74, 75, 76. It is seen that each of the pivot points, such as pivot point 81 for the valve section 74, pivot point 143 for the multiplexer valve 140, pivot point 125 for the upper section 76 are each mounted for rotation within the valve body 148 for adjusting the position of respective valve elements or flappers in accordance with the structure and function described in connection with FIG. 3. As in connection with FIG. 3, all of the valve outputs 0 through 8 are taken from the highest level valve section 76 which is best illustrated in FIG. 5 while the intermediate porting between the valves is also illustrated in the diagrams of FIGS. 4-6. The same reference numerals are utilized in FIGS. 4-6 as in FIG. 3 and the description of those elements and their interrelationship will not be repeated here. However, the figure does illustrate that the entire system of FIG. 3 (less the electronics and the channel equipment) can be configured in a relatively small block occupying a cube measuring only about 2 inches by about 2 inches by about 4 inches. The resulting weight and space saving will be appreciated when it is recalled that such a valving arrangement not only produces the modulated fluid flow necessary for control of one channel, but utilizes that modulated fluid flow for control of 8 individual channels.

Figure 7:
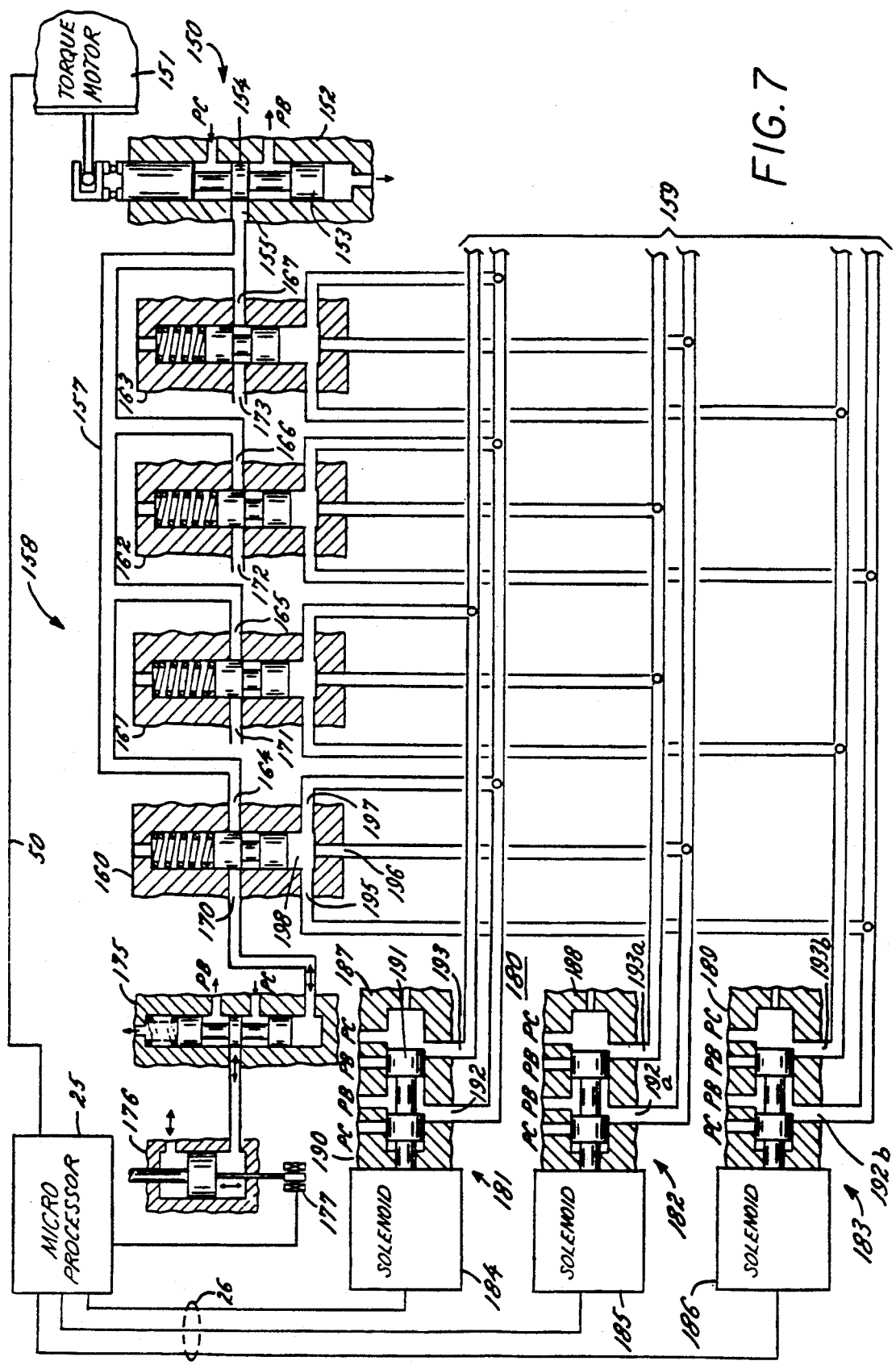
FIG. 7 is a diagrammatic illustrations of yet a further embodiment of the present invention illustrating the use of binary hydraulic logic signals.

FIG. 7 represents a further embodiment of the invention which differs from the embodiments described above in a number of respects. First of all, while the embodiment does contain a multiplexer having a common input and a plurality of individually selectable outputs, the multiplexer is not in the form of a logic tree. Thus, the common input is simply a connection or manifold supplying a plurality of gate type valves in the multiplexer with fluid from the common source of modulated hydraulic fluid.

A second difference is the translation of the electrical binary addressing signals of the earlier embodiments into hydraulic binary addressing signals which operate on the multiplexer elements for selecting a single addressed output. Thus, the source of multi-bit binary addressing signals is a hydraulic source to produce hydraulic binary addressing signals, which hydraulic source may or may not include electrical actuators for translating binary electrical addressing signals produced by the microprocessor into the necessary binary hydraulic signals.

Turning more specifically to FIG. 7, there is again shown a microprocessor 25 which has a number of functions including the production of a plurality of electrical control signals on its control bus 50 which are related to actuator position or changes in actuator position in the respective channels. The bus 50 is coupled to modulating means 150 which serves to produce modulated hydraulic signals in accordance with the electrical control signals coupled onto the bus 50. In the illustrated embodiment, the modulating means 150 includes a torque motor 151, which is responsive to the succession of electrical signals, and which drives a spool valve 152. The vertical positioning of the spool 153 in the spool valve by the torque motor 151 adjusts the position of a land 154 which thereby controls the degree to which an output port 155 is opened and whether that port is opened to the high pressure source PC or sump PB. It is seen that the output port is coupled to a schematically illustrated manifold 157 (which can be a unitary manifold or a series of independent connections) which serves as a common input for multiplexer means generally indicated at 158. In the illustrated embodiment, the multiplexer means 158 comprises a plurality of hydraulic gates 160-163. While only four gates are illustrated in FIG. 7, utilizing a three-bit binary address as in the previous embodiments would allow for eight, and supplementing that address with an additional bit would allow for 16. The fact that the system provides for additional gates and channels is indicated by the heads in the hydraulic logic addressing channels indicated at 159.

Each of the hydraulic gates 160-163 has a control input port 164-167, respectively, connected to the common source of modulated hydraulic signals 157, and an output port 170-173, respectively, connected to its associated channel. FIG. 7 shows the details of only a single channel, that connected to the hydraulic gate 160, and shows it, as in the prior embodiments, to include a second stage valve 175 connected to the hydraulic source PC and hydraulic sump PB for controllably delivering fluid to a hydraulic actuator 176 which is the operative element of the channel. The actuator 176 has a feedback device 177 coupled to the microprocessor 25 for providing position and rate of movement information to the microprocessor.

In addition to functioning as the source of electrical control signals, the microprocessor 25 also functions as a source of multi-bit binary selector signals for individually addressing the respective channels serviced by the multiplexer 158. To that end, as in the previous embodiments, the microprocessor 25 has a selector bus 26 onto which the multi-bit binary selector signals are coupled.

In practicing the embodiment of FIG. 7, the binary electrical signals are converted into binary hydraulic signals by hydraulic valve means generally indicated at 180. The hydraulic valve means 180 responds to the binary electrical signals by producing a corresponding plurality of binary hydraulic selector signals. The hydraulic valve means in the illustrated embodiment comprises a series of solenoid operated hydraulic valves 181-183, each having a solenoid 184-186 coupled to and driving a spool valve 187-189.

Because it is necessary for the decoding scheme of FIG. 7 to have both the binary hydraulic signal which corresponds directly to the binary electrical signal as well as its inverse, each of the hydraulic valves 187-189 includes a pair of lands 190, 191 and a pair of outputs 192, 193. The source PC and drain PB hydraulic pressures are connected to the valve such that one of the outputs 192, 193 will be at source (or high) pressure and the other at sump (or low) pressure for any given condition of the associated solenoid. Thus, in the deactivated condition shown in FIG. 7, for the solenoid 187 the output 192 will be at sump and the output 193 at source pressure. When the solenoid is activated, the lands are translated to the right, switching the output 193 to sump and the output 192 to source.

In practice of the embodiment of FIG. 7, hydraulic gates 160-163 are responsive to the hydraulic logic signals produced by the valves 187-189 to selectively and individually couple the modulated hydraulic signal on the common input 157 to the addressed output. To that end, the gates 160-163 function as three input AND gates, for example, the gate 160 having three inputs 195, 196, 197 all feeding a common chamber 198. Whenever all three inputs are at high pressure, the valve will be activated connecting the modulated source at input port 164 to the output 170 and thereby to its associated second stage valve. When any of the inputs 195-197 is at sump, there will be insufficient pressure in the chamber 198 to raise the piston and open the valve.

In view of the fact that the inlets 195-197 are each connected to the lefthand port 192, 192a, 192b of the binary hydraulic valves 181-183, and recalling that all three of those inputs are at sump when the associated solenoids are deactivated, it will be appreciated that all three solenoids 184-186 must be energized in order to couple the high pressure source to the ports 192, 192a, 192b. Thus, a binary 7 produced by the microprocessor 25 and coupled to the selector bus 100 will energize all of the solenoids 184-186, coupling high pressure to the output ports 192, 192a, 192b, thus energizing the selector valve 160. If a binary 6 were coupled onto the bus 100, and considering the solenoid 184 to respond to the most significant bit, it will now be apparent that the selector 163 will be addressed to couple its input control port 167 to its output port 173 and thus pass modulated hydraulic fluid to the associated channel. The activation of selector 163 is illustrated by the raised condition of spool 163a which translates port 163b to a position where it allows fluid passage between input and output.

Turning now to FIG. 8, there is shown another embodiment of the present invention which also utilizes binary hydraulic control signals for operation of a hydraulic multiplexer. As in the prior embodiments, means are provided, shown in FIG. 8 as microprocessor 25, for producing two types of signals, electrical control signals which are output on bus 50 for modulating a hydraulic signal, and selector signals which are output on bus 26 for selecting the channel associated with the control signal, so that the multiplexer can pass the modulated hydraulic signal from the hydraulic modulator to the addressed channel.

Referring in greater detail to FIG. 8, it is seen that the binary electrical address signals which are output on bus 26 are coupled to a plurality of three-way solenoid operated hydraulic valves 200, 201, 202. The valves 201-202 each have a pair of input ports, a first port 203 being coupled to the high pressure source PC and a second port 204 being coupled to the hydraulic sump PB. Output ports 205, 206, 207 carry binary hydraulic addresses which are in the form of high pressure signals PC or sump signals PB depending upon whether the associated solenoid valve 200-202 is energized or de-energized. In the de-energized condition, sump PB is coupled to the output port whereas in the energized condition hydraulic source passes PC to the output.

In practicing this embodiment of the invention, means are provided for responding to the hydraulic binary address signals to couple the modulated hydraulic input to the addressed hydraulic output, thereby to control the actuator position or rate of travel in the addressed channel. In the illustrated embodiment, such means are provided by a hydraulically actuated cylinder 210 comprising a valve body 211 in which is mounted a hydraulically actuated piston assembly 212. The piston 212 has a plurality of binary weighted lands 213, 214, 215 which are disposed in the valve body in individual chambers 216, 217, 218 such that they can be individually operated. The areas of the lands are weighted in binary fashion, for example with the land 213 having an area of one unit, the area of land 214 being two units, and the area of land 215 being four units. If additional lands are utilized, they would each double in area from the immediately prior land to continue the binary weighting.

With the areas of the piston lands being weighted in binary fashion, with the chambers associated with such lands being individually pressurizable, and with the selector valves 200-202 connected to the respective chambers 216-218, it will now be appreciated that the address produced by the microprocessor will control the position of the actuator 212. For example, if only valve 200 is energized, pressure is applied only to land 213 which will cause one unit of actuator movement to the right. By way of contrast, if only valve 202 were energized, the same pressure being applied to the piston land 215, which is four times greater in area than that of the land 213, will serve to move the actuator four units. Furthermore, if all of the solenoid operated valves 200-202 are energized, pressure would be applied to all lands 213-216, causing the actuator 212 to move to the right seven units.

In practicing the invention, output ports 220 are associated with the actuator 212 such that they are individually opened depending upon the position of the actuator 212 and how many units from its rest position it has been translated by the hydraulic address signals. It is noted that the output ports are shown only schematically in FIG. 8 since they must be mechanically tightly packed in order to achieve independent port selection with the limited actuator travel available. It will be apparent to those skilled in this art that in mechanically configuring the output ports they will be axially close together and, to accomplish that, they can be made rather long and thin and can also be circumferentially displaced from each other around the body of the valve in order to restrict the total port axial length to a length of the valve body 210 commensurate with actuator travel.

Recalling the description of piston displacement based upon the combination of selector valves 200-202 which is activated, it will be appreciated that when none of the selector valves is activated, the piston is in its leftmost quiescent position and the zeroth channel 221 is connected to translatable outlet port 222 so that fluid can be passed to the zeroth channel. For the other extreme, when all of the selector valves 200-202 are energized, the multi-land piston will be translated furthest right to make the movable outlet port 222 congruent with the seventh channel outlet port 223, thereby passing fluid through the output to the associated channel. The channel is schematically indicated in FIG. 8 as including a second stage valve 225 driving a hydraulic actuator 226 having feedback means 227 connected back to microprocessor 25, in a fashion illustrated in greater detail in connection with the other embodiments.

The FIG. 8 embodiment illustrates a further integration of the hydraulic modulating means responsive to the electrical control signals with the multiplexer means. To that end, the valve body 211 includes a pair of inlet ports 230, 231, the port 230 being coupled to the hydraulic source PC and the port 231 to the hydraulic sump PB. The inner bore 232 of the valve body 211 is cylindrical, and in it is mounted for reciprocation a cylindrical valve member 233 which carries the output port 222. It is seen that the cylindrical valve member 233 is affixed to the multi-landed position 212 at 234 and thereby is translated to positions dictated by the hydraulic logic signals applied. The PC and PB inlets coupled to inlet ports 230, 231 are controllably passed to an internal chamber 235 formed within the valve member 233. The porting is indicated schematically in FIG. 9. There it is seen that a pair of elongate slots 230, 231 are found in the cylindrical valve body; it is also recalled that the slot 230 is connected to hydraulic source PC and the port 231 to hydraulic sump PB. A further elongate slot 242 is formed in the cylindrical valve member 233 for controllable communication with the ports 230, 231. For controlling the coupling of the cylinder port 242 with the input ports 230, 231 control means 245 are provided in the illustrated embodiment in the form of a rotary torquer or voice coil. The actuator of the rotary torquer 245 is connected to the valve member 233 by means such as a splined connection which will allow the rotary torquer 245 to rotate the operator 233 but will allow the multi-landed piston 212 to translate the actuator 233 for performing the multiplexing function.

Thus, the microprocessor 25 produces the electrical control signals described above which are coupled on bus 50 to the rotary torquer 245 to rotate the operator 233, controllably connecting the port 242 with either the ports 230 or 231, depending upon the sense and magnitude of the applied electrical signals. As a result, a modulated hydraulic flow is produced which is passed by the multiplexer to the addressed channels.

The rotary torquer 245 can be operated in either digital fashion or in the analog fashion described in connection with the prior embodiments. In digital fashion, the rotary torquer need only have three positions, the off position indicated in FIG. 8 and a pair of on positions where the port 242 is connected to the ports 230 in one condition, or 231 in the other condition. Thus, the flow rate whenever the ports are connected will be the same, and the microprocessor 25 controls the time of actuation in order to control the modulation of the hydraulic signal. By way of contrast, in the analog implementation, as in the prior embodiments, the microprocessor 25 controls the degree to which the ports 230 or 231 are opened as a modulating mechanism.

Figure 10:
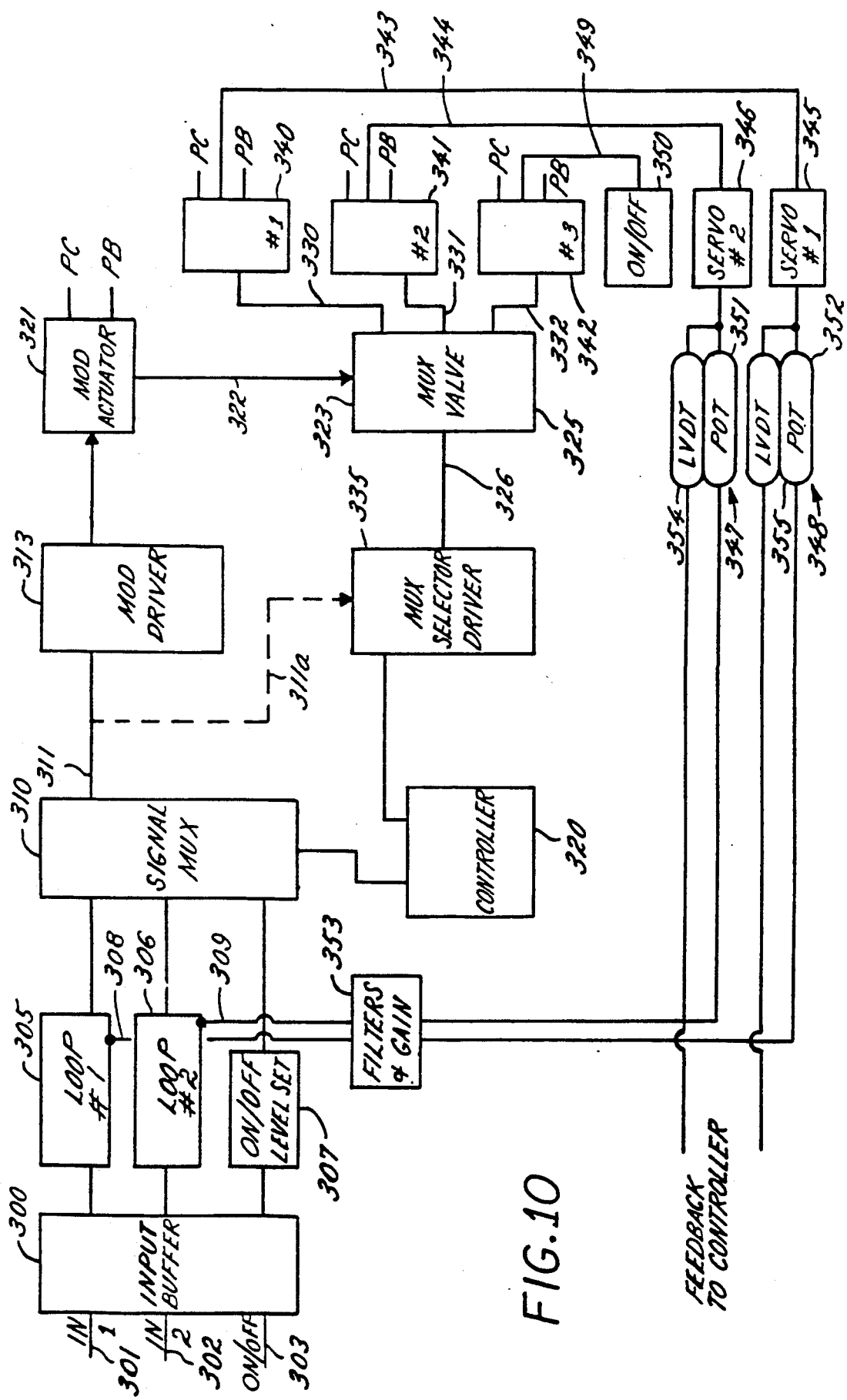
FIG. 10 is a block diagram illustrating a control system operable with the multiplexed hydraulic systems of FIGS. 1-9.

Directing attention now to FIG. 10, there is shown a control loop for a multiple channel multiplexed system, in the illustrated embodiment comprising three channels. The FIG. 10 embodiment also illustrates a further modification in that two of the channels include conventional servo actuators with position and rate feedback means, while the third channel includes an on/off actuator which requires no feedback means. Such a system illustrates that one or several on/off devices can be intermixed with the controlled position actuators in the multiplexed control, and that is particularly suitable in a random access system where the control can ignore the on/off channels except on the comparatively rare occasion when it is desired to switch from one state to the other.

Referring in greater detail to FIG. 10, there is shown an input buffer circuit 300 having three input signals coupled thereto on lines 301-303. Two of the input signals are like those described in connection with FIG. 1, i.e., have levels (typically current levels) or binary digital valves which relate to a demanded position for the associated actuator. A third signal on line 303 is simply an on/off signal which demands that the actuator in the associated channel be switched either on or off. The signals, having passed through the buffer 300, are coupled to associated control loops 305, 306, 307. The loops 305 and 306 are similar to each other in that they compare the associated input signal from the buffer with a feedback signal on lines 308, 309, respectively for establishing an output signal which is proportional to the flow intended to be sent to the associated second stage valve in the next cycle. As noted above, the feedback signal is preferably both a position signal and a rate signal which, when combined with the input demand signal as will be described below, produces an output signal for controlling fluid flow to the associated actuator.

The on/off signal from the third channel is coupled to on/off level set controller 307, and in this case needs no feedback from the associated actuator. The three signals on the three controllers are coupled as inputs to a signal multiplexer 310 which has a single output bus 311, operated under the control of a master controller 320 to individually introduce signals onto the output bus 311 representative of the multiplexer input signals. As noted above, the signals can be in a sequential order, but the master controller 320 also has the ability, particularly operating in conjunction with a master computer for the aircraft, to vary not only the sequence of the signals output on the bus 311, but also their dwell time.

The sequence of control signals whose values are to determine the flow rate to selected channels are passed through a conventional driver circuit 313 which produces modulated output signals which are used to control a modulating actuator 321. It is recalled from the above-described embodiments that the modulating actuator which is responsive to an electrical signal to produce a corresponding hydraulic signal was illustrated as a torque motor or a voice coil coupled to and driving a modulating valve. As shown in FIG. 10, the modulating actuator has the hydraulic source PC and sump PB connected thereto, and serves to modulate between those levels in dependence on the electrical signal provided by the driver 313. The single hydraulic input produced by the modulating actuator 321 is coupled via a hydraulic line 322 to the input 323 of a multiplexing valve 325, one embodiment of which is the multiplexing valve 21 of FIG. 1. The multiplexing valve has selector inputs applied on binary bus 326, in the form of binary electrical signals which control the coupling of the single input 322 to individual ones of a plurality of outputs 330, 331, 332. The selector signals are produced by a multiplex selector driver 335 which in turn is responsive to the master controller 320. The master controller 320 thus has complete control over both the signal multiplexer 310 and the multiplex selector driver 335 such that by producing appropriate signals on its output it can cause the signal multiplexer 310 to select the electrical control signal for a channel to be altered, while at the same time imposing signals on the multiplex selector driver 335 to cause the multiplex valve to select that channel. Thus, the modulator 321 produces a hydraulic flow on input line 322 which it is desired to pass to the channel in question, and the multiplexer valve selects that channel for appropriately passing the signal to the selected channel.

Hydraulic outputs from the multiplexer valve 323 found on lines 330, 331, 332 are coupled to the respective channels, and serve as inputs to second stage valves 340, 341, 342. As was described in connection with, for example, FIG. 1, the hydraulic signal received from the multiplexer causes translation of an internal spool in the second stage valve which causes flow to the valve output port from either the high pressure source PC or to the low pressure sump PB. It is seen that output lines from the second stage valve are coupled via lines 343, 344 to appropriate servo actuators 345, 346, respectively. The servo actuators in turn are positioned in dependence upon the flow rate through the second stage valve which itself is a function of the flow rate received from the modulating actuator 321 by way of the multiplex valve 323.

As noted above, the servo valves include feedback means 347, 348 preferably for providing both position and rate of movement indication to the processor. The second stage valve 342 has its output coupled on a hydraulic line 349 to an on/off controller 350 and thereby toggles the controller 350 to the on or off condition, depending on the signal from its associated second stage valve.

As shown in FIG. 10, each of the feedback means may comprise a pair of feedback sensors. The first can include potentiometers 351, 352 which have signals passed through filter and gain circuitry 353 to provide the respective feedback signals 308, 309 which are passed to the controllers 305, 306. As noted above, such signals can provide both position information for use by the controller in driving the actuator to the demanded position established on lines 301, 302, and also rate information used by the controller 320 to stabilize the loop. In addition to the feedback potentiometers 351, 352, additional feedback sensors can include LVDT sensors 354, 355 having lines coupled as feedback to the master controller, such as the master controller for the aircraft. The master controller may sense the position of the servos through the feedback means and adjust the demand signals on lines 301, 302 to achieve actuator positions which might be computed by a master on-board computer.

It will be apparent to those skilled in this art that the electrical control elements illustrated in the overall FIG. 10 system will typically be configured as a suitably programmed microprocessor, such as microprocessor 25 described in connection with FIGS. 1-9. In that implementation, it will be apparent that either the system will provide digital signals as inputs on lines 301, 302 or, if analog signals are utilized, an analog-to-digital converter will be associated with the input buffer 300 to digitize those signals. Similarly, digital feedback signals will be produced by the feedback sensors 351, 352 or, in the alternative, if analog sensors are utilized, a suitable analog-to-digital converter will be associated with filter and gain circuitry 353 to produce digital signals for the remaining processing. Finally, a digital-to-analog converter will be associated with the output of modulation driver 313 for those embodiments which utilize a voice coil or torque motor in its analog mode. Alternatively, if a digital actuator is utilized such as in the digital mode of the FIG. 8 embodiment, digital signals will be used to control the modulation actuator 321.

Significantly, no digital-to-analog converter will be necessary for control of the multiplexer, and the multiplexer selector driver 335 will pass digital binary signals directly to the multiplexing valve for directly addressing the associated channel. That feature introduces a degree of simplification for the multiplexer selector driver, but in addition provides an additional degree of simplification for the multiplexer itself. More particularly, as will now be apparent to those skilled in this art, the selection and driving of the multiplexer is greatly simplified, requiring no complex drive circuitry for the multiplexer and utilizing parts in the multiplexer, such as ordinary solenoid operated valves, which are simple and inexpensive to manufacture and can be produced to operate with the high reliability demanded of jet aircraft controls.

It will now be apparent that what has been provided is an improved hydraulic multiplexed control system in which the controller has extreme flexibility of establishing the order in which the channels are to be serviced and the dwell time for servicing of each channel. Even though in normal operation it may prove desirable for the controller to service the ports in sequence, in emergency or abnormal conditions the controller, when properly programmed, has the flexibility to give most attention to the channels which are most critical, a feature noticeably absent in the use of rotary multiplexers. Furthermore, the multiplexer itself, as well as the multiplexer drive circuitry, is greatly simplified by utilizing direct digital control.

What is claimed is:

1. A multiplexed hydraulic control system having a plurality of channels for individually controlling the positions of a plurality of actuators in the respective channels in accordance with a corresponding plurality of electrical control signals, the control system comprising the combination of:

a source of multi-bit binary selector signals for individually addressing the respective channels;

multiplexer means having a common input and a plurality of outputs individually and selectively connectible to the input, means coupling the multiplexer outputs to the respective channels for controllably positioning the actuators in the channels, the multiplexer means having a selector input coupled to the source of binary selector signals for selectively connecting the multiplexer input with the output coupled to the addressed channel;

means for modulating a hydraulic signal in accordance with selected ones of the plurality of electrical control signals and applying said modulated hydraulic signal to the channel addressed by the multiplexer means; and control means for coordinating the modulating of the hydraulic signal with the selector signals produced by the source of binary selector signals thereby to couple hydraulic signals to the channels for controlling the positions of the actuators in said channels in accordance with the associated plurality of electrical signals.

2. The multiplexed hydraulic control system of claim 1 in which the means for modulating and applying further includes a plurality of selector valves individual ones of which are connected to each output of the multiplexer means and adapted to be operated when the associated channel is addressed by the multiplexer, the selector valve having an input port coupled to the modulating means and an output port coupled to the channel, the selector valve being arranged to be operated for coupling its input to its output when the multiplexer addresses the associated channel.

3. The multiplexed hydraulic control system of claim 1 in which the means for modulating and applying further includes a connection between the modulating means and the common input of the multiplexer for passing the modulated hydraulic signal through the multiplexer to the addressed channel.

4. The multiplexed hydraulic control system of claim 3 wherein the multiplexer means includes a single level of hydraulic valves, each of said valves having an input which collectively serve as the common input of said multiplexer, and each of said valves having an output which serve as the respective multiplexer outputs.

5. The multiplexed hydraulic control system of claim 3 wherein said multiplexer means includes a plurality of selector valves arranged in a multi-level logic tree, the selector valves in each level having inputs connected in logic tree fashion to outputs of the selector valves in the preceding level, the lowest level having its input connected to the modulating means for receiving the modulated hydraulic signal, the selector valves in the highest level having their outputs connected to the channels to serve as the multiplexer outputs, the logic tree being arranged to produce a single addressable path through the logic tree for actuating the addressed channel in response to the selector signals produced by the source of binary selector signals.

6. The multiplexed hydraulic control system of claim 1 in which the source of binary selector signals comprises means for producing a multi-bit binary electrical signal;

the multiplexer means comprising a plurality of selector valves arranged in a multi-level logic tree branching from a single input to a plurality of outputs, the input and outputs of the selector valve tree serving as the multiplexer input and outputs, respectively; and the multiplexer means further including electrically responsive means for responding to the multi-bit binary electrical signals and in response thereto controlling the selector valves in a corresponding binary fashion to connect the input to the addressed output of the logic tree.

7. The multiplexed hydraulic control system of claim 6 in which the means for modulating and applying includes a connection between the modulation means and the common input of the multiplexer for passing the modulated hydraulic signals through the logic tree from the input to the addressed output.

8. The multiplexed hydraulic control system of claim 6 in which the selector valves comprise flapper valves each having an input and first and second outputs, and flapper means for selectively connecting input to the first or second output.

9. The multiplexed hydraulic control system of claim 8 in which the flapper valves are connected in multiple binary weighted levels with inputs of valves in a given level being connected to outputs of valves in the next lower level to form said logic tree, the outputs of the valves in the highest level serving as the multiplexer outputs, the input of the valve in the lowest level serving as the multiplexer input.

10. The multiplexed hydraulic control system of claim 9 in which the means for modulating and applying includes a connection between the modulating means and the input of the valve in the lowest level for passing the modulated hydraulic signals through the multiplexer to the addressed channel.

11. The multiplexed hydraulic control system of claim 6 in which the multiplexing means comprises a plurality of solenoid operated selector valves having an input selectively connectible to first and second outputs, solenoid means having on and off conditions for operating the solenoid operated selector valve to selectively connect the input to the first or second output, and the solenoid means being connected to respond to the multi-bit binary electrical signal and in response thereto controlling the solenoid operated valves in a corresponding binary fashion to route modulated fluid from the input to the outlet addressed by the binary electrical signals.

12. The multiplexed hydraulic control system of claim 11 in which the solenoid operated selector valves are connected in multiple binary weighted levels with inputs of valves in a given level being connected to outputs of valves in the next lower level to form said logic tree, the outputs of the solenoid operated selector valves in the highest level serving as the multiplexer outputs, the input of the solenoid operated selector valve in the lowest level serving as the multiplexer input.

13. The multiplexed hydraulic control system of claim 1 in which the source of binary selector signals comprises means for producing a plurality of multi-bit binary weighted hydraulic selector signals;

the multiplexer means comprising a hydraulically actuated cylinder having a piston actuator with a plurality of binary weighted lands thereon, the respective binary weighted lands being located in associated individual chambers for receiving hydraulic fluid to act against the associated land, means coupling the binary weighted hydraulic signals to the individual chambers for acting on the binary weighted lands to translate the actuator by a distance related to the resultant value of the binary weighted hydraulic selector signals supplied, the hydraulically actuated cylinder having a plurality of output ports arranged in a predetermined array and means associated with the cylinder for selectively and individually opening the output ports in response to the position of the actuator, the output ports being so positioned and arranged as to be selectively opened in response to the position of the actuator achieved by fluid flow to find combinations of the binary weighted lands.

14. The multiplexed hydraulic control system of claim 13 in which the hydraulically actuated cylinder has an input port coupled to an internal chamber, the internal chamber also being selectively connectible to the output ports for connecting the multiplexer input to the addressed output, a pair of input ports associated with the cylinder, one being connected to a source of hydraulic pressure and the other to hydraulic sump, the modulating means including a rotary actuator selectively connecting the internal chamber input port to the source or sump thereby to provide said modulated hydraulic signal.

15. The multiplexed hydraulic control system of claim 14 in which the plurality of electrical control signals are coupled to the rotary actuator for controlling the position thereof, said electrical control signals having discrete levels, one of which couples the internal chamber input port to the hydraulic source, and another of which couples the internal chamber input port to hydraulic sump.

16. The multiplexed hydraulic control system of claim 14 in which the plurality of electrical control signals are coupled to the rotary actuator, the plurality of electrical control signals being continuous in nature for selectively opening the internal chamber input port to hydraulic source or sump by amounts which correspond to the magnitude of the electrical control signals.

17. The multiplexed hydraulic control system of claim 1 in which the multiplexer means comprises a plurality of hydraulic gates associated with the respective channels, each gate having a plurality of hydraulic logic inputs for activating the gate when satisfied, each gate also having a modulated input serving as a part of the multiplexer input for receiving the modulated hydraulic signal and an output connected to the associated channel serving as the multiplexer output for the associated channel;

the source of binary selector signals comprising means for producing a plurality of multi-bit binary hydraulic selector signals; and means coupling selected ones of the hydraulic selector signals to the hydraulic logic inputs of the gates for individually addressing the gates and thereby coupling the modulated hydraulic signal to the associated channel.

* * * * *